United States Patent Office 3,024,289
Patented Mar. 6, 1962

3,024,289
PREPARATION OF POLYNITRO COMPOUNDS
Henry Feuer, Lafayette, Ind., and Robert Miller, East Patterson, N.J., assignors to Purdue Research Foundation, Lafayette, Ind., a corporation of Indiana
No Drawing. Filed Mar. 3, 1959, Ser. No. 796,741
7 Claims. (Cl. 260—644)

Our invention relates to a process for the preparation of polynitro compounds and more particularly to a process for preparing polynitro compounds by reaction of a 2-nitroester with the salt of a nitro compound in the presence of a base.

In the past, there has been no convenient method for the preparation of polynitro compounds by the addition of two nitro compounds. The Michael type addition of a primary or secondary nitroparaffin to a nitroolefin has found limited application but has not been considered generally acceptable due to the fact that high molecular weight nitroolefins are difficult to prepare and difficult to purify. Furthermore, the high temperature necessary to produce and purify nitroolefins is detrimental to the nitroolefin, and some nitroolefins have a tendency to polymerize under the basic conditions of the reaction needed to catalyze the Michael addition.

We have now found that we can produce polynitro compounds by the addition of two nitro compounds by a novel method which leads to many and varied polynitro compounds. Our new process is convenient, economical, results in good yields of the desired polynitro compound and opens the door to new and different polynitro compounds of broad scope and wide utility.

The 2-nitroalkylesters which we employ in our process can be either mono or polyesters and can be substituted by alkyl, phenyl, perhalo, alkyl, and halo radicals. Acids used in preparing these esters may be organic or inorganic. Organic acids which can be used include lower aliphatic acids, such as acetic, butyric, hexanoic, etc.; aryl acids which can be used include acids such as benzoic acid, p-nitrobenzoic acid, 2-phenylacetic acid, etc. Inorganic acids which we can use in preparing our 2-nitroesters include sulfuric, aryl sulfonic, nitric, phosphoric, hydrochloric, boric, etc. Examples of our 2-nitroesters include 2-nitrobutyl acetate,
2-nitrobutyl formate,
2-nitrobutyl phosphate,
2-nitrobutyl nitrate,
2-nitrobutyl sulfonate,
3,3,4,4,5,5,5-heptafluoro-2-nitro-1-pentyl acetate,
2,5-dinitrohexyl acetate,
2-nitro-1-phenylbutyl propionate,
1,6-diacetoxy-2,5-dinitrohexane,
3,3,4,4,5,5,5-heptafluoro-1-nitro-2-pentyl phosphate,
2,2-dinitroethyl acetate,
2-chloro-2-nitroethyl acetate,
2-carbethoxy-2-nitroethyl acetate,
3,3-dimethyl-2,4,4-trinitrobutyl acetate,
2-phenyl-2-nitroethyl butyrate,
2-acetoxy-3-nitrobutane,
1,7-diacetoxy-1,7-diphenyl-2,6-dinitroheptane, etc.

Salts of nitroparaffins which we can use include both mono and polynitro salts. These salts can be substituted with halo, cyano, carbamyl, lower carbalkoxy, lower alkoxy, lower perhaloalkyl, —$CO_2R^6$, formyl, etc. Salt-forming cations which we can employ include alkali metals and alkaline earth metals. We prefer to employ the sodium salt of an aliphatic mononitro compound or aliphatic dinitro compound such as the sodium salt of 1-nitropropane,
2-nitropropane,
1,1,6,6-tetranitrohexane,
1,1-dinitropropane,
2-nitrobutanol,
2,6-dinitro-1,7-heptanediol,
2-nitro-1,3-propanediol,
dinitrophenylmethane,
1-chloro-1-nitropropane,
4,4,4,3,3,2,2-heptafluoro-1-nitrobutane,
2,5-dinitroadiponitrile,
2,5-dinitroadipoamide,
2,5-dinitrocyclopentanone,
ethyl nitroacetate,
nitromalonaldehyde,
2-ethoxy-1-nitroethane, etc.

The new polynitro compounds which we obtain according to our new process have the following structural formula:

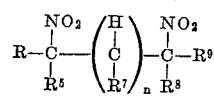

where R is phenyl,

or

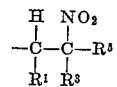

$R^1$ is hydrogen or lower alkyl; $R^2$ is phenyl, halo, perhalo or nitro; $R^3$ is hydrogen, —$NO_2$, alkyl, lower hydroxyalkyl, phenyl, halo, perhalo, cyano, carbamyl, formyl, $$-\overset{O}{\underset{\|}{C}}-R^4, -COR^4$$

$R^4$ is lower alkyl or phenyl; $R^5$ is lower hydroxyalkyl, phenyl, halo, perhalo, cyano, carbamyl, $$-\overset{O}{\underset{\|}{C}}-R^4$$

formyl, —$CO_2R^4$, —$CO_2R^6$ or —$CH_2OR^4$; $R^6$ is an alkali or alkaline earth metal radical; $R^7$ is hydrogen, lower alkyl, phenyl, or perhalo; $n$ is a number from 1 to 8; $R^8$ is lower hydroxyalkyl, phenyl, cyano, carbamyl, formyl, $$-\overset{O}{\underset{\|}{C}}-R^4$$

—$CO_2R^4$, —$CO_2R^6$, or —$CH_2OR^4$; $R^9$ is —$NO_2$, lower hydroxyalkyl, phenyl, halo, cyano, carbamyl, formyl $$-\overset{O}{\underset{\|}{C}}-R^4$$

—$CO_2R^4$, —$CO_2R^6$, —$CH_2OR^4$,

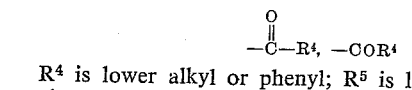

$R^{10}$ is —$NO_2$, phenyl, halo, or perhalo; $R^{11}$ is lower hydroxyalkyl, phenyl, halo, perhalo, cyano, carbamyl, $$-\overset{O}{\underset{\|}{C}}-R^4$$

formyl, —$CO_2R^6$, —$CH_2OR^4$. Typical polynitro compounds which we can obtain according to our new process include 3,5-dinitroheptane,
2-methyl-2,4-dinitrohexane,
3,5,5,10,10,12-hexanitrotetradecane, 3,3,5-trinitroheptane,
2-ethyl-2,4-dinitro-1-hexanol,
5,9-dihydroxymethyl-3,5,9,11-tetranitrotridecane,
2-hydroxymethyl-2,4-dinitro-1-hexanol,
3,3,5,8,10,10-hexanitrododecane,
2,9-dimethyl-2,4,7,9-tetranitrodecane,
2,9-diethyl-2,4,7,9-tetranitro-1,10-decanediol,
3-methyl-2-perfluoropropyl-1,3-dinitrobutane,
1,1,1,2,2,3,3-heptafluoro-6-chloro-4,6-dinitrohexane,
2,5-bis(2'-carbethoxy-2'-nitroethyl)-2,5-dinitrocyclopentanone,
1,8-diphenyl-3,6-dicyano-1,3,6,8-tetranitrooctane,
2-formyl-5,5-dimethyl-2,4,6,6-tetranitrohexanal,
4-ethoxy-1,1,3-trinitrobutane,
3,9-diphenyl-2,10-dichloro-2,4,8,10-tetranitroundecane,
1-phenyl-2-methyl-1,1,3-trinitrobutane,
1-carbethoxy-1,3-dinitrobutane,
2,4-dinitro-1-hexanenitrile,
4-benzyl-2,4-dinitrobutanenitrile,
2,4,6,8-tetranitro-5-ketononanediamide,
2(2,4,8,10-tetranitro-1,11 - undecanedioxy)bis - tetrahydropyran,
1,1-diacetyl-2-methyl-1,3-dinitropentane,
1-carbethoxy-1-acetyl-4-phenyl-1,4-dinitrobutane, etc.

As indicated above, we carry out our reaction at relatively low temperatures ranging from 0° C. to 100° C. with the preferred range of about 20 to about 50° C. and in the presence of a base. Bases which can be employed include carbonates, bicarbonates, sulfites, phosphates, borates and hydrides, such as, for example, sodium acetate, other similar alkali metal salts of lower aliphatic acids, sodium hydroxide, other similar alkali metal and alkaline earth metal hydroxides, an excess of the salt of the aliphatic mononitro or dinitro compound, etc.

Our compounds can be used to form polymers useful as both solid and liquid propellants for reaction motors. These polymers can be fluids or solids, depending on the chain length of the polymers, the nature of the cross-linking agents, etc. These polymers are also stable to shock, heat, etc. to the extent that, as a general rule, additional stabilizers are not required in the propellant mixtures. Our monomers are plasticizers for nitropolymers formed from said monomers.

As previously indicated, low molecular weight polymers prepared from the monomers of our invention can be fluids. These propellants are generally rich in fuel elements and, as such, can be utilized as a fuel in the process of U.S. Patent 2,537,526 where tetranitromethane and hexanitroethane were used as oxidants and liquid nitroparaffins were used as fuels; and in the processes described in U.S. Patents 2,582,048 and 2,548,803 wherein nitro substituted aliphatic compounds having more than one nitro group per carbon atom were used as oxidants and nitro substituted compounds having less than one nitro group per carbon atom were used as fuels in monopropellant systems; or in the similar process of U.S. Patent 2,590,009.

We have found that generally our solid polymers can be dissolved in polar solvents, such as dimethylformamide and lower nitroalkanes, such as tetranitromethane, and, as such, are operative as fuels in the above-described processes. Other solvents which can be used to liquify our polymers include dimethylsulfoxide, cellosolve, acetonitrile, lower alkanols, nitroesters, and nitroethers.

Our polymers can be mixed with various oxidant salts such as ammonium nitrate, ammonium perchlorate, lithium perchlorate, etc. to obtain solid heterogeneous propellants having specific impulses on the order of that of Ballistite.

The following examples are offered to illustrate our new invention, but we do not intend to be limited to the specific materials, proportions, or procedures set forth therein. Rather, we intend to include within the scope of our invention all equivalents obvious to those skilled in the art.

*Example I*

In a suitable flask, 1.63 grams of 98% sodium hydroxide was dissolved in 15 ml. of water and the solution cooled to 0.5° C. after which 5.32 grams of 1,1,6,6-tetranitrohexane was added. After salt formation was complete, 6.44 grams of 2-nitrobutyl acetate was added employing 65 ml. of methanol for washing. Anhydrous sodium acetate in the amount of 3.28 grams was then added and the reaction mixture allowed to stir for six hours at 26° C. after which it was stirred for 10 more hours at 40° C. The reaction mixture was then cooled and filtered giving 6.1 grams of 3,5,5,10,10,12-hexanitrotetradecane. *Analysis.*—Calculated: N=17.95. Found: N=18.13.

*Example II*

In the same manner as that described in Example I, the sodium salt of 2-nitropropane was reacted with 2-nitrobutyl acetate to obtain 2-methyl-2,4-dinitrohexane. *Analysis.*—Calculated: N=14.73. Found: N=14.95.

*Example III*

In a suitable apparatus, a solution of 175 ml. of methanol and 25 ml. of water were mixed with 15.3 grams of the damp sodium salt of 2-nitro-1,3-propanediol, 8.2 grams of anhydrous sodium acetate and 16.1 grams of 2-nitrobutyl acetate. The reaction vessel was maintained at 33–34° C. for 18 hours after which the methanol was removed in vacuo and the aqueous residue extracted with ether. The solvent was removed by means of a water aspirator and the residual oil placed under vacuum until it solidified to an oily solid which was recrystallized first from benzene and then from chloroform. The product was 2-hydroxymethyl-2,4-dinitro - 1 - hexanol. *Analysis.*—Calculated: N=12.61. Found: N=12.47.

*Example IV*

In a suitable apparatus, 8.04 grams of 1,1-dinitropropane was added to a solution of 4.9 grams of 98% sodium hydroxide in 100 ml. of water at a temperature of 0–5° C. The mixture was stirred until salt formation was complete after which 3.6 grams of glacial acetic acid was added slowly and then 8.76 grams of 1,6-diacetoxy-2,5-dinitrohexane in 30 ml. of methanol was added all at once. The reaction mixture was allowed to stir for 16 hours at 50° C. after which the reaction mixture was cooled and filtered yielding 12.47 grams of 3,3,5,8,10,10-hexanitrododecane which was recrystallized from hot glacial acetic acid. *Analysis.*—Calculated: N=19.09. Found: N=18.92.

*Example V*

In a suitable apparatus, 26.79 g. (0.3 mole) of 2-nitropropane was added to a solution of 12.3 g. of 98% sodium hydroxide dissolved in a mixture of 25 ml. of water and 20 ml. of methanol and cooled to a temperature of 0–5° C. The mixture was stirred until salt formation was complete, after which 24.15 g. (0.15 mole) of 2-nitrobutyl acetate was added all at once in 40 ml. of methanol. The reaction mixture was stirred for 13 hours at 38–40° C., and then cooled to 0–5° C. Glacial acetic acid, 12 ml., was introduced into the reaction mixture, which was then stirred for one hour. At the end of this time the solvent was removed by vacuum distillation and the residual oily solid was taken up in water and extracted with small portions of ether until the ether mixture was clear. Evaporation of the ether yielded 24.7 g. (87% theoretical) of 2-methyl-2,4-dinitrohexane.

*Example VI*

To a 500 ml. three-necked flask equipped with a stirrer, condenser and a thermometer, containing 8.16 g. (0.2 mole) of 98% assay sodium hydroxide dissolved in a mixture of 45 ml. of water and 230 ml. of tert. butanol, was added 17.8 g. (0.2 mole) of 2-nitropropane. The reaction was allowed to come to room temperature, and after salt formation was complete, 16.1 g. (0.1 mole) of 3- nitro-2-butyl acetate was added all at once. The reaction was then heated to 39–40° for 17 hours. Then, 7.0 g. of glacial acetic acid was added all at once, the tert. butanol was removed in vacuo and the aqueous residue was extracted with small portions of ether until the ether layer was colorless. The extracts were combined, and the solvent was removed in vacuo. The residual oil was distilled, yielding 10.9 g. or a 57% yield of product, B.P. 85–91° at 0.75–1.00 mm. On redistillation, an analytical sample was obtained, B.P. 80° at 0.5 mm.; $n_D^{20}$ 1.4650. Anal. Calculated for $C_7H_{14}N_2O_4$: C, 44.21; H, 7.37; N, 14.73. Found: C, 44.47; H, 7.60; N, 14.94.

*Example VII*

To a 300 ml., three-necked flask equipped with a condenser, thermometer and stirrer, containing 2.44 g. (0.06 mole) of 98% sodium hydroxide dissolved in a solution of 20 ml. of methanol and 20 ml. of water at 0–5°, were added 5.34 g. (0.06 mole) of 2-nitropropane and 4.92 g. (0.06 mole) of anhydrous sodium acetate. After salt formation was complete, 8.76 (0.03 mole) of 1,6-diacetoxy-2,5-dinitrohexane was added all at once, employing 65 ml. of methanol for washing. The reaction was then heated to 34° and maintained there for 16 hours. It was then cooled and filtered and the precipitate was washed with water and dried in a desiccator. The product weighed 10.3 g. (M.P. 170–175° dec.) or a 98% yield.

Separation of the diastereoisomers was accomplished by recrystallizing from benzene, one of the isomers crystallizing out (M.P. 193–194° dec.) the other being quite soluble. Evaporation of the filtrates and recrystallization from a mixture of benzene and cyclohexane yielded the second isomer (M.P. 161–163°). Analysis of the higher melting isomer: Anal. Calculated for $C_{12}H_{22}N_4O_8$: C, 41.14; H, 6.28; N, 16.00. Found: C, 41.16; H, 6.49; N, 16.04. The analysis of the lower melting isomer: Anal. Calculated for $C_{12}H_{22}N_4O_8$: C, 41.14; H, 6.28; N, 16.00. Found: C, 41.14; H, 6.52; N, 15.87.

*Example VIII*

To a 500 ml., three-necked flask equipped with a condenser, stirrer, and thermometer, containing 0.41 g. (0.01 mole) of 98% assay sodium hydroxide dissolved in a mixture of 40 ml. of water, 100 ml. of methanol and 100 ml. of tetrahydrofuran at 0–5°, was added 1.33 g. (0.005 mole) of 1,1,6,6-tetranitrohexane. After salt formation was complete, 1.88 g. (0.005 mole) of 1,6-diacetoxy-2,5-dinitrohexane and 0.82 g. (0.01 mole) of anhydrous sodium acetate were added all at once, employing 65 ml. of tetrahydrofuran for washing. The reaction temperature was raised to 40° and maintained there for 40 hours. At the end of this time the reaction mixture was cooled and filtered. The filtered precipitate (1.05 g.) was found to be a polymer of undetermined molecular weight. This material did not melt, but rather turned black at approximately 190°.

*Example IX*

In a 300 ml. three-necked flask equipped with a mechanical stirrer, condenser and thermometer, was dissolved 0.41 g. (0.01 mole) of 98% assay sodium hydroxide in 10 ml. of water. The solution was cooled to 0–5° and 1.50 g. (0.01 mole) of ethylene dinitramine was added slowly. After salt formation was complete, 100 ml. of dimethyl sulfoxide was added slowly while maintaining the temperature between 10–15°. To this mixture was added 0.82 g. (0.01 mole) of anhydrous sodium acetate and then 2.92 g. (0.01 mole) of 1,6-diacetoxy-2,5-dinitrohexane. The reaction temperature was maintained at 35–37° for 14 hours. At the end of this time, the reaction mixture was poured slowly with stirring into a beaker containing 600 ml. of water. This effected precipitation of the polymer which was separated from the solution by centrifuging the mixture. The polymer was then washed with methanol and placed on a clay plate to dry. Final stages of drying were accomplished in vacuo and a light brown powder resulted. This material softened at 180° and decomposed at 200°. Infrared spectra of this material showed two different nitro bands, ($C-NO_2$, $N-NO_2$), and the characteristic peaks which have been obtained from other derivatives prepared from ethylene dinitramine and nitro olefins.

This application is a continuation-in-part of our copending application, Serial No. 670,212, filed July 5, 1957, now abandoned.

Now having described our invention what we claim is:
1. A process for the preparation of 3,5,5,10,10,12-hexanitrotetradecane which comprises contacting the sodium salt of 1,1,6,6-tetranitrohexane with 2-nitrobutyl acetate in the presence of sodium acetate.
2. A process for the preparation of 2-hydroxymethyl-2,4-dinitro-1-hexanol which comprises contacting the sodium salt of 2-nitro-1,3-propanediol with 2-nitrobutyl acetate in the presence of sodium acetate.
3. A process for the preparation of 3,3,5,8,10,10-hexanitrododecane which comprises contacting a sodium salt of 1,1-dinitropropane with 1,6-diacetoxy-2,5-dinitrohexane in the presence of sodium acetate.
4. A process for the production of polynitro compounds which comprises reacting a 2-nitroalkylester, said ester being prepared from a lower aliphatic carboxylic acid, with the salt of a nitro compound selected from the group consisting of saturated lower aliphatic mononitroalkanes and saturated lower aliphatic dinitroalkanes in the presence of a base.
5. The process of claim 4 wherein the reaction mixture is maintained at about 0 to about 100° C.
6. The process of claim 4 wherein the reaction mixture is maintained at about 20 to about 50° C.
7. The process of claim 4 wherein the salt-forming cation is selected from the group consisting of alkali metals and alkaline earth metals.

References Cited in the file of this patent

UNITED STATES PATENTS

| | | |
|---|---|---|
| 2,583,048 | Hannum et al. | Jan. 22, 1952 |
| 2,813,913 | Welz et al. | Nov. 19, 1957 |
| 2,880,245 | Bachman et al. | Mar. 31, 1959 |

FOREIGN PATENTS

| | | |
|---|---|---|
| 138,456 | Sweden | Dec. 23, 1952 |

OTHER REFERENCES

Herzog et al.: American Chemical Society Abstracts of Papers of 118th meeting (1950), page 25 N.

Konowalow: "Chem. Deut. Ber.," 29, 2199–2205 (1896).

Pauwels: "Centralblatt," I, page 193 (1898).